(12) United States Patent
Kratochvil (10) Patent No.: US 8,863,088 B2
(45) Date of Patent: Oct. 14, 2014

(54) SIMULATING A LINE OF SOURCE CODE IN A DEBUGGING TOOL

(75) Inventor: Jan Kratochvil, Pecka (CS)

(73) Assignee: Red Hat, Inc., Raleigh, NC (US)

( * ) Notice: Subject to any disclaimer, the term of this patent is extended or adjusted under 35 U.S.C. 154(b) by 826 days.

(21) Appl. No.: 12/701,806

(22) Filed: Feb. 8, 2010

(65) Prior Publication Data

US 2011/0197179 A1 Aug. 11, 2011

(51) Int. Cl.
*G06F 9/44* (2006.01)
*G06F 9/45* (2006.01)
*G06F 11/36* (2006.01)

(52) U.S. Cl.
CPC .......... *G06F 11/3664* (2013.01); *G06F 11/362* (2013.01)
USPC .............................. 717/125; 717/124; 717/148

(58) Field of Classification Search
CPC .................................. G06F 9/455; G06F 11/36
USPC .......................................... 717/125, 124, 148
See application file for complete search history.

(56) References Cited

U.S. PATENT DOCUMENTS

| 7,487,321 | B2 * | 2/2009 | Muthiah et al. | 711/170 |
|---|---|---|---|---|
| 8,015,552 | B1 * | 9/2011 | Lindahl et al. | 717/128 |
| 8,090,989 | B2 * | 1/2012 | Law et al. | 714/35 |
| 8,307,435 | B1 * | 11/2012 | Mann et al. | 726/22 |
| 2002/0059558 | A1 * | 5/2002 | Hines | 717/103 |
| 2002/0168054 | A1 * | 11/2002 | Klos et al. | 379/1.04 |
| 2003/0093174 | A1 * | 5/2003 | Nikulin | 700/121 |
| 2003/0188296 | A1 * | 10/2003 | Bates et al. | 717/130 |
| 2004/0123186 | A1 * | 6/2004 | Kulp et al. | 714/38 |
| 2004/0168155 | A1 * | 8/2004 | O'Farrell et al. | 717/129 |
| 2005/0102583 | A1 * | 5/2005 | Spadari | 714/45 |
| 2005/0246696 | A1 * | 11/2005 | Alexander et al. | 717/151 |
| 2006/0195744 | A1 * | 8/2006 | Petersen | 714/741 |
| 2007/0016893 | A1 * | 1/2007 | Branda et al. | 717/127 |
| 2007/0033577 | A1 * | 2/2007 | Arackal | 717/124 |
| 2007/0234294 | A1 * | 10/2007 | Gooding | 717/124 |
| 2008/0178046 | A1 * | 7/2008 | Kulp et al. | 714/38 |
| 2008/0195507 | A1 * | 8/2008 | Ratnakar | 705/27 |
| 2008/0320448 | A1 * | 12/2008 | Dimpsey et al. | 717/125 |
| 2010/0023811 | A1 * | 1/2010 | Moyer | 714/47 |
| 2010/0042975 | A1 * | 2/2010 | Schneider et al. | 717/125 |
| 2010/0050158 | A1 * | 2/2010 | Daniel | 717/125 |
| 2012/0030660 | A1 * | 2/2012 | McGrath | 717/152 |

* cited by examiner

*Primary Examiner* — Idriss N Alrobaye
*Assistant Examiner* — Getente A Yimer
(74) *Attorney, Agent, or Firm* — Lowenstein Sandler LLP (57) ABSTRACT

A source line simulator system determines a line of source code that corresponds to a virtual return address in response to executing a debugging command on the source code. The simulator system determines whether the line of source code that corresponds to the virtual return address is correct and can enable a simulator mode based on a determination that the line of source code that corresponds to the virtual return address is not correct. The simulator system can generate a debugging graphical user interface (GUI) that displays an indicator at a line of source code that is correct.

17 Claims, 9 Drawing Sheets

SIMULATING A LINE OF SOURCE CODE IN A DEBUGGING TOOL

TECHNICAL FIELD

Embodiments of the present invention relate to debugging tools. Specifically, the embodiments of the present invention relate to a method and system for simulating a correct line of source code in a debugging tool.

BACKGROUND

Software may be developed using different target CPU architectures. For example, a large enterprise that develops software products may have an extensive number of computing systems for developing and debugging software source code. The computing systems may each have a different CPU architecture, such as systems having an X86 processor and systems having an IA-64 "Itanium" processor. A software developer may use the X86 system to design and debug the source code, but may also use the IA-64 system while designing and debugging the source code, or vice versa. In another example, while at work, a software developer may use a computing system to design and debug source code. However, a software developer may also work using a home system which may have a different CPU architecture from the software developer's work system. For instance, the software developer may use a gaming system at home to design and debug the source code.

While debugging the source code, software developers expect that the behavior of the source code and the behavior of the debugging tool remain consistent across the different target CPU architectures. However, the various CPU architectures may process the same source code differently. For example, a user may initiate a debugging finish command to have a specified source code function continue execution and stop exactly at the moment the specified function has exited and returned to its caller function. After initiating a finish command, a user may expect to see an indicator in a debugging graphical user interface (GUI) at the line of source code that corresponds to the executed function call source line at the caller function. A user may debug source code using an IA-64 system, initiate a debugging finish command, and see an indicator in the debugging GUI at the executed function call source line at the caller function as expected. The user, however, may debug the same source code using an X86 system. After initiating a finish command, the user may not see an indicator in the debugging GUI at the executed function call source line at the caller function, but rather, at the next source line instead. This inconsistency in the behavior of debugging the same source code on various target CPU architecture can create an inadequate and inefficient software development environment.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for simulating a correct line of source code in a debugging tool. A source line simulator system determines a line of source code that corresponds to a virtual return address in response to executing a debugging command on the source code. The simulator system determines whether the line of source code that corresponds to the virtual return address is correct and can enable a simulator mode based on a determination that the line of source code that corresponds to the virtual return address is not correct. The simulator system can generate a debugging graphical user interface (GUI) that displays an indicator at a line of source code that is correct.

Embodiments of the present invention enable users (e.g., software programmers, software developers) to debug source code across various target CPU architectures in a consistent manner. A user can execute a debug command, such as a finish command, to continue the execution of a specified source code function and stop exactly at the moment the specified function has exited and returned to its caller function. The caller function is the function which invoked the specified function. When initiating a finish command, a user may expect to see an indicator in a debugging GUI at the line of source code that corresponds to the call of the executed function in the caller function. However, depending on the target CPU architecture which the source code is compiled for and the CPU architecture used to debug the source code, a debugging GUI may display an indicator at a line of source code that is not correct (a line of source code that is not what a user expects). Embodiments of the present invention can simulate a line of source code that is correct and display a debugging GUI that includes an indicator at the correct line of source code. For example, when a user initiates a finish command, a line of source code that corresponds to a virtual return address is correct if it corresponds to the source line calling the executed function in the caller function. Embodiments of the present invention can simulate the correct line of source code to unify the debugging process across various target CPU architectures. Embodiments of the present invention can be applicable to debugging commands, such as a finish command and a return command.

Figure 1:
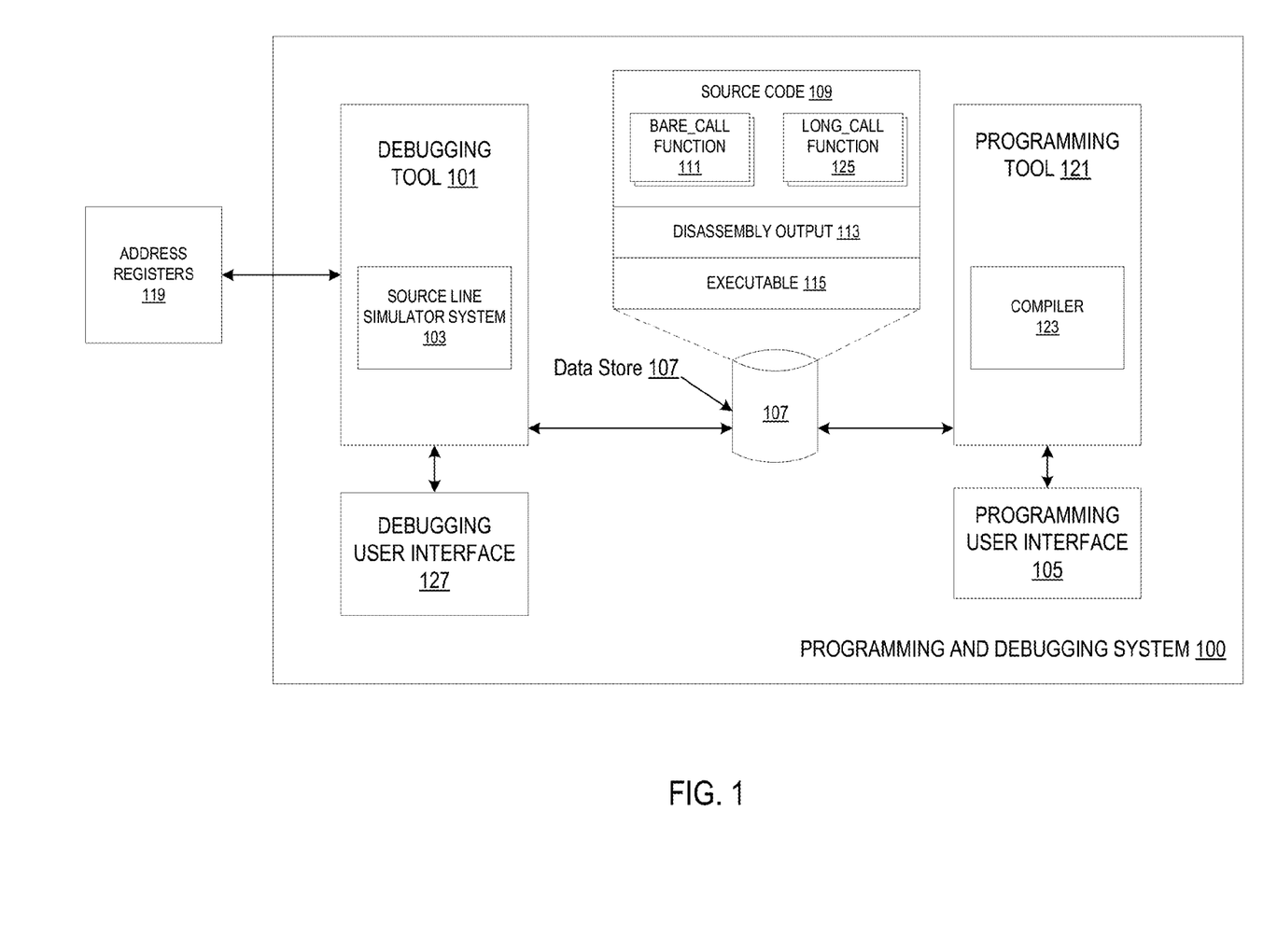
FIG. 1 illustrates an exemplary programming and debugging system in which embodiments of the present invention may operate.

FIG. 1 illustrates an exemplary programming and debugging system 100 for simulating a line of source code for a caller function. The programming and debugging system 100 can be hosted by a computer system (e.g., a server, client, workstation, desktop, tablet, one or more small portable platforms such as a notebook, a PDA (personal digital assistant), or wireless web devices, and other devices). An exemplary computer system is described in greater detail below in conjunction with FIG. 8. The programming and debugging system 100 can include a debugging tool 101, a programming tool 121, a data store 107, a programming user interface 105, and a debugging user interface 127.

Figure 2:
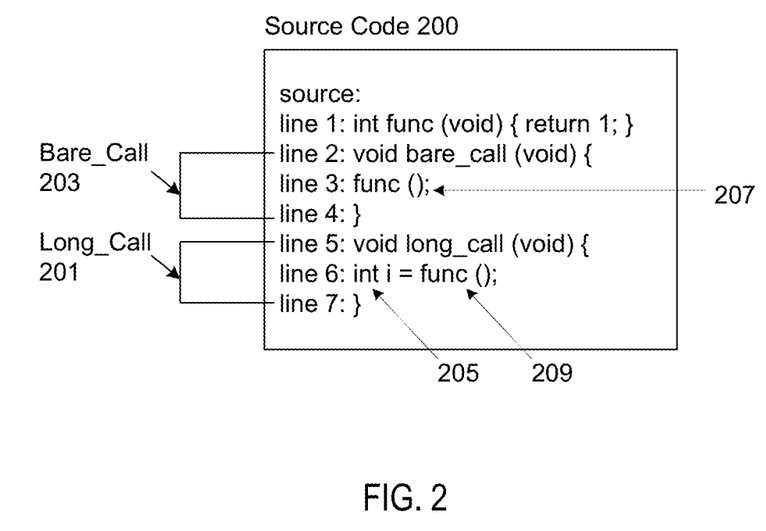
FIG. 2 illustrates exemplary source code.

A programming user interface 105 can receive user input that defines source code functions to be performed. The programming user interface 105 can be coupled to a programming tool 121 to define logic using the user input. The logic can be referred to as source code 109. Examples of a programming tool 121 include tools for programming in Java, Perl, Python, Ada, C, C++, FreeBASIC, FreePascal, and Fortran. Source code 109 can include one or more functions, for example, one or more bare_call functions 111 and one or more long_call functions 125. A long_call function 125 can be a function that includes a local integer. A bare_call function 111 can be a function that does not include a local integer. For example, FIG. 2 illustrates exemplary source code 200 that can include a long_call function 201 at lines 5 to 7 and a bare_call function 203 at lines 2 to 4. The bare_call function 203 has one instruction 207 at source line 3 and another instruction at source line 4. Unlike the bare_call function 203, the long_call function 201 has a local variable i. The long_call function 201 has three instructions where two of them are 205, 209 at source line 6 and the third one is at source line 7. There is an instruction 209 to execute the function and another instruction 205 to assign the return value from executing the function to the local variable i.

Returning to FIG. 1, the programming tool 121 can include a compiler 123 to convert the source code 109 into operable information. The compiler 123 can compile the source code 109 for different target CPU architectures, for example, machines having an IA-64 "Itanium" processor and machines having an X86 processor. The operable information can be an executable file 115. The programming tool 121 can be coupled to a data store 107 for storing the logic (e.g., source code 109) and the operable information (e.g., executable file 115). The data store 107 can be implemented on a main memory (not shown) or other data storage device (not shown). The data store 107 can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

A user (e.g., software programmer, software developer) can use a debugging tool 101 to execute the executable file 115 and to debug the source code 109. An example of a debugging tool 101 is the GNU Debugger (GDB) for the GNU operating system. A debugging user interface 127 can receive debugging commands, such as a finish command, and can display an indicator that represents the location of the current point of execution of the source code. The debugging user interface 127 can be a graphical user interface (GUI). A user can use a debugging finish command to continue the execution of a specified source code function and stop exactly at the moment the specified function has exited and returned to its caller function. The caller function is the function which invoked the specified function. When initiating a finish command, a user may expect to see an indicator in the GUI 127 at the line of source code that corresponds to the source line calling the specified function at the caller function. However, depending on the target CPU architecture which the source code 109 is compiled into the executable 115 to be debugged, a debugging GUI 127 may display an indicator at a line of source code that is not correct (a line of source code that is not what a user expects).

Figure 3A:
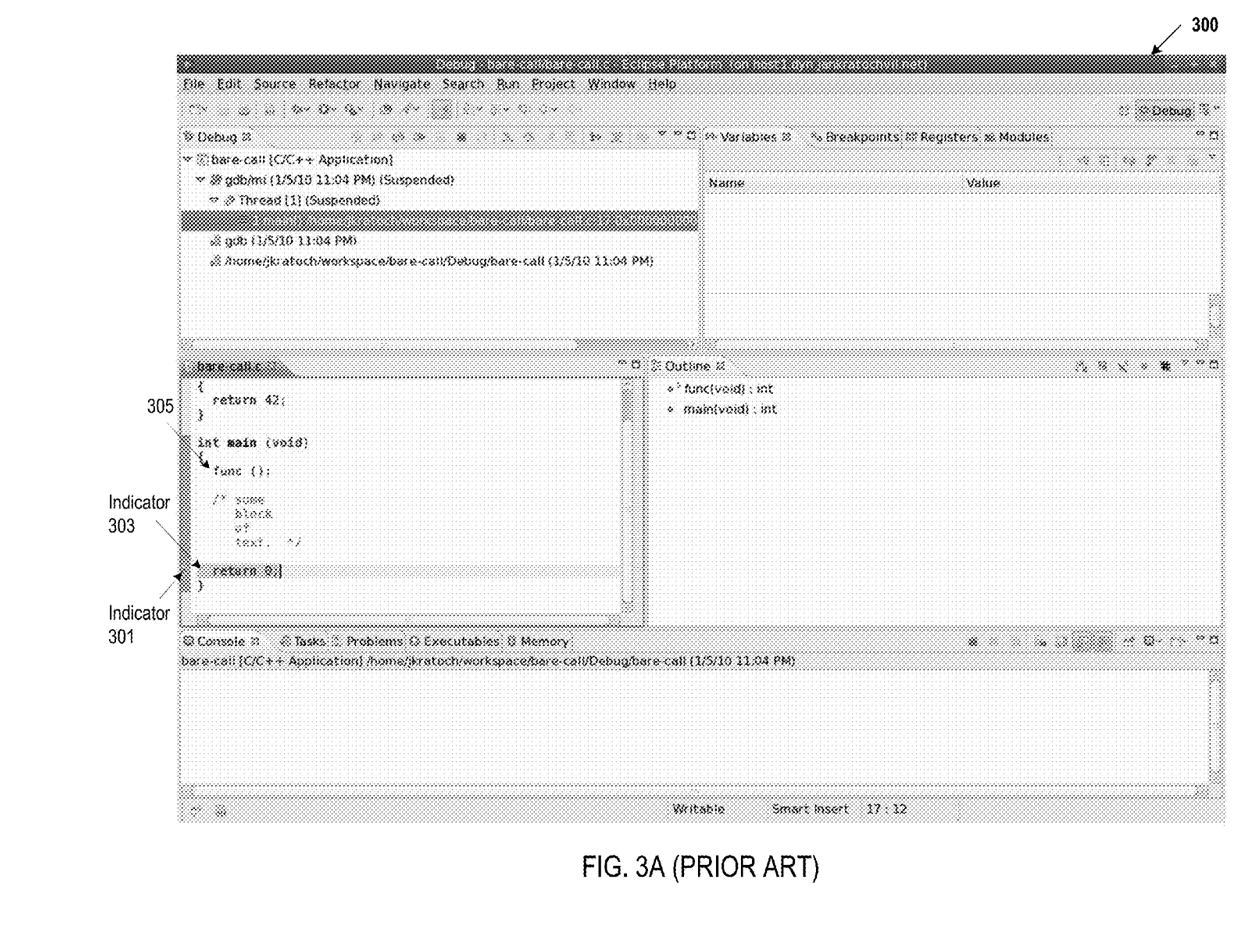
FIG. 3A illustrates a graphical user interface (GUI) and components of the GUI to indicate an incorrect line of source code.

The debugging tool 101 can include a source line simulator system 103 for simulating a line of source code that is correct and for displaying a debugging GUI 127 that includes an indicator at the correct line of source code. For example, when a user initiates a finish command, a line of source code that corresponds to a virtual return address is correct if it corresponds to the source line calling the executed function at the caller function. For instance, a user may initiate a finish command for a bare_call function 111 and may expect that when the bare_call function 111 finishes, a debugging GUI 127 displays an indicator at the source line of a call of the bare_call function 111 at the caller function. FIG. 3A illustrates a GUI 300 and components of the GUI 300 to indicate an incorrect line of source code—without methodologies of the present invention applied. A user may expect to see an indicator in the GUI 300 at the call of the function 'func' 305, which is at the caller function. However, the target CPU architecture which the source code is compiled for and being debugged, may cause the debugging tool to behave differently than a user expects. For example, a system that has an X86 processor may finish the bare_call function, but display in GUI 300 an indicator 301, 303 at the next instruction after the 'func' call, which is the return source line, instead of at the call 305 at the caller function as a user may expect.

The source line simulator system 103 can simulate a correct line of source code in response to executing a debugging command (e.g., a line of source code that corresponds to a source line of a call of the executed function at the caller function when executing a finish command) and can generate the debugging GUI 127 that displays an indicator at the simulated (correct) source code line as a user may expect. For example, in FIG. 3B, which illustrates an exemplary GUI 350 and components of the GUI 350 to simulate a line of source code, the source line simulator system can simulate that execution of the finish command for a bare_call function stops at the call 355 of the function 'func' and the debugging GUI 350 includes an indicator 351, 353 at the call of the function 'func'. The indicator can be an arrow or some other visual indicator (e.g., highlighted text, image, etc.) to indicate the current point of execution in the source code.

Returning to FIG. 1, the programming and debugging system 100 can be coupled to address registers 119. Address registers 119 hold addresses that may be instructions. Address registers 119 can hold an instruction pointer (IP). The instruction pointer (IP) is the address of an instruction that will be executed on the next instruction step. The simulator system 103 can query the address registers 119 for the instruction pointer (IP) in response to executing a debugging command. A return address (LR) and a debugging instruction pointer (PC) are virtual address registers used for internal operation of the debugging tool 101. The virtual return address (LR) represents an address where a debugging tool 101 stops after executing a finish command, such as an address of an instruction at the caller that follows the call instruction. The virtual return address minus one (LR−1) represents an address that is within the call instruction itself. After execution of the finish command, the virtual return address (LR) is set equal to the instruction pointer (i.e., LR=IP). A virtual debugging instruction pointer (PC) represents the address considered by the debugging tool 101 to be a current instruction pointer for displaying the source code 109 state in the debugging user interface 127. The virtual debugging instruction pointer (PC) is described in greater detail below in conjunction with FIG. 4.

The simulator system 103 can determine which line of source code 109 corresponds to a particular address. For example, the simulator system 103 can determine which line of source code 109 corresponds to the virtual return address (LR) and which line of source code 109 corresponds to the virtual return address minus one (LR−1). The simulator system 103 can examine disassembly output 113 stored in the data store 107 to determine which line of source code 109 corresponds to a particular address. The debugging tool 101 can produce the disassembly output 113. A dissassembler is a computer program that translates machine language into assembly language. The disassembly output 113 can be formatted for human-readability. The disassembly output 113 corresponds to lines of source code 109 and corresponds to addresses, which is described in greater detail below in conjunction with FIG. 5B. The simulator system 103 can determine whether the line of source code that corresponds to the virtual return address (LR) is correct (a line of source code a user expects). The simulator system 103 can determine whether the line of source code that corresponds to the virtual return address (LR) is correct by determining whether the line of source code that corresponds to the virtual return address (LR) is the same line of source code that corresponds to the virtual return address minus one (LR−1).

The simulator system 103 can enable a simulator mode to simulate a correct line of source code in the debugging tool 101. The simulator system 103 can determine whether to enable the simulator mode or normal mode based on whether the line of source code that corresponds to the virtual return address is correct (e.g., whether the line of source code that corresponds to the virtual return address is the same line of source code that corresponds to the virtual return address minus one). The simulator system 103 can enable normal mode if the line of source code that corresponds to the virtual return address is correct and can enable simulator mode if the line of source code that corresponds to the virtual return address is not correct. To enable normal mode, the simulator system 103 can set the virtual debugging instruction pointer (PC), which is the address considered by the debugging tool 101 to be a current instruction pointer, equal to the next instruction pointer (IP) (i.e., PC=IP). To enable simulator mode, the simulator system 103 can set the virtual debugging instruction pointer (PC) to be PC=IP−1. The simulator system 103 can disable the simulator mode and return to a normal mode by setting the address for the virtual debugging instruction pointer (PC) back to being equal to the address of the next instruction pointer (PC=IP). The debugging GUI 127 can display an indicator at the correct line of source code based on the address value of the virtual debugging instruction pointer (PC). The indicator can be an arrow or some other indicator (e.g., highlighted text, image, etc.) to indicate the current point of execution in the source code.

The source line simulator system 103 can be implemented as hardware, computer-implemented software, firmware or a combination thereof. In one embodiment, the source line simulator system 103 comprises instructions stored in memory 804 that cause a processing device 802 in FIG. 8 described in greater detail below to perform the functions of the source line simulator system 103.

Figure 4:
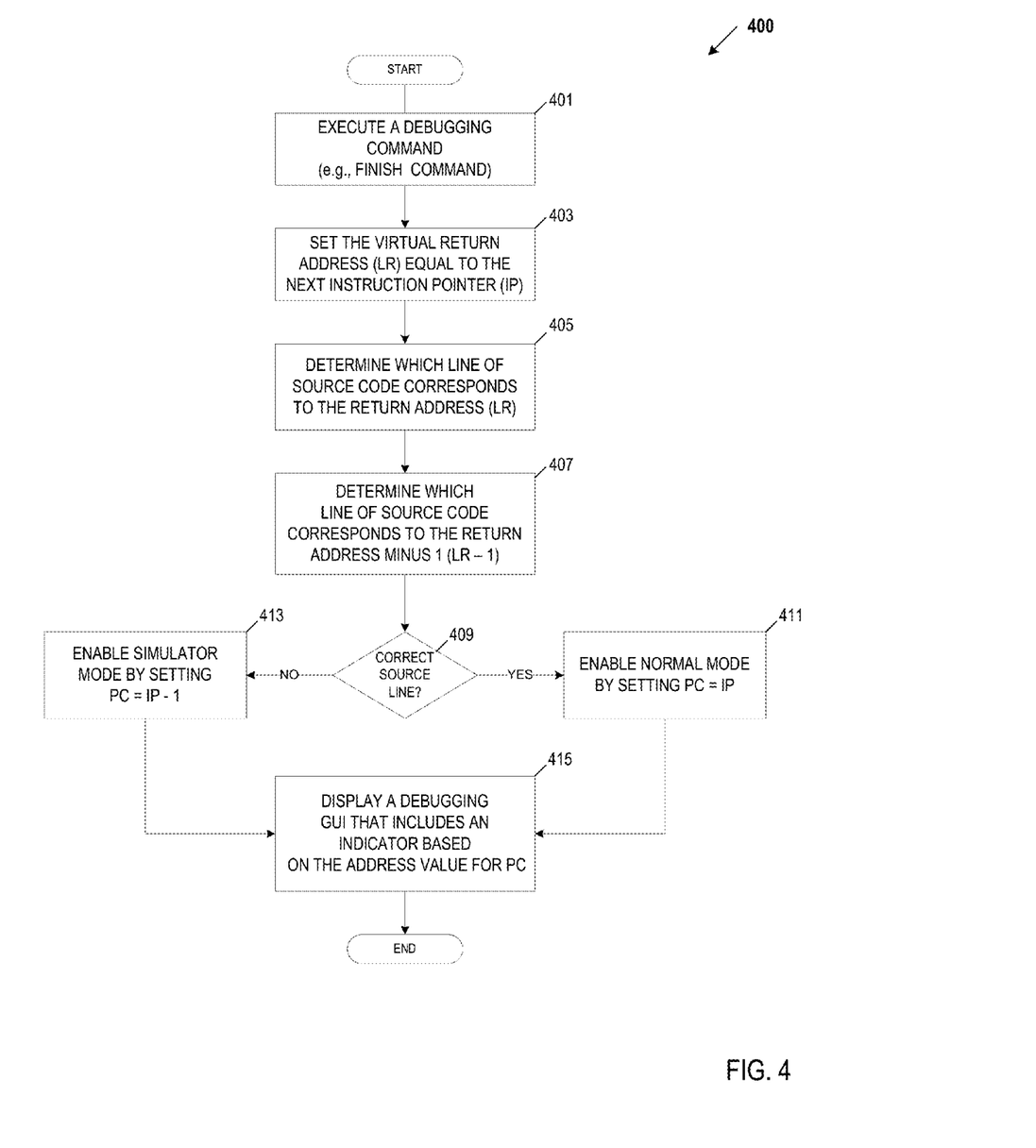
FIG. 4 is a flow diagram which illustrates an embodiment of a method for simulating a correct line of source code in a debugging tool.

FIG. 4 is a flow diagram which illustrates an embodiment of a method 400 for simulating a correct line of source code in a debugging tool. For example, method 400 can be performed for finishing the execution of a source code function and generating a debugging GUI that indicates a line of source code corresponding to the call at the caller function. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the source line simulator system 103 in a programming and debugging system 100 of FIG. 1.

In one embodiment, the method 400 can be initiated upon the source line simulator system receiving a user request to execute a debugging command (e.g, finish command, return command) for a function in the source code. At block 401, the source line simulator system executes the debugging command. Execution of a finish command continues execution of a function and stops exactly at the moment a current function has exited and returned to its caller function.

At block 403, the simulator system queries address registers for a next instruction pointer (IP) and sets the virtual return address (LR) equal to the address of the next instruction point (IP). The virtual return address (LR) represents the address where a debugging tool stops after executing the finish command.

At block 405, the simulator system determines which line of source code corresponds to the virtual return address (LR). The simulator system can examine disassembly output produced by the debugging tool to determine which line of source code corresponds to the virtual return address. When executing a finish command, the virtual return address (LR) represents an address of a caller instruction that follows the call instruction. Therefore, the virtual return address minus one (LR−1) represents an address that is within the call instruction itself. At block 407, the simulator system determines which line of source code corresponds to the address at the virtual return address minus one (LR−1). The simulator system can examine disassembly output to determine which line of source code corresponds to the virtual return address minus one.

At block 409, the simulator system determines whether the line of source code that corresponds to the virtual return address (LR) is correct. The simulator system can determine whether it is correct by determining whether the line of source code that corresponds to the virtual return address (LR) is the same line of source code that corresponds to the virtual return address minus one (LR−1). The line of source code that corresponds to the virtual return address (LR) is correct if the source code lines are the same, and the simulator system can enable normal mode at block 411. The simulator system can enable normal mode by setting the address for the virtual debugging instruction pointer (PC) equal to the address of the next instruction pointer (i.e., PC=IP). The line of source code that corresponds to the virtual return address (LR) is not correct if the line of source code that corresponds to the virtual return address is not the same line of source code that corresponds to the virtual return address minus one (at block 409), and the simulator system can enable simulator mode to simulate a correct line of source code at block 413 (e.g., a line of source code corresponding to a source line of a call of the executed function at the caller function after executing a finish command). Simulator mode can simulate a preceding address (i.e., the address of the call instruction at the caller function). The simulator system can enable simulator mode by setting the virtual debugging instruction pointer (PC) to the address of the next instruction pointer (IP) minus one (i.e., PC=IP−1).

Figure 6:
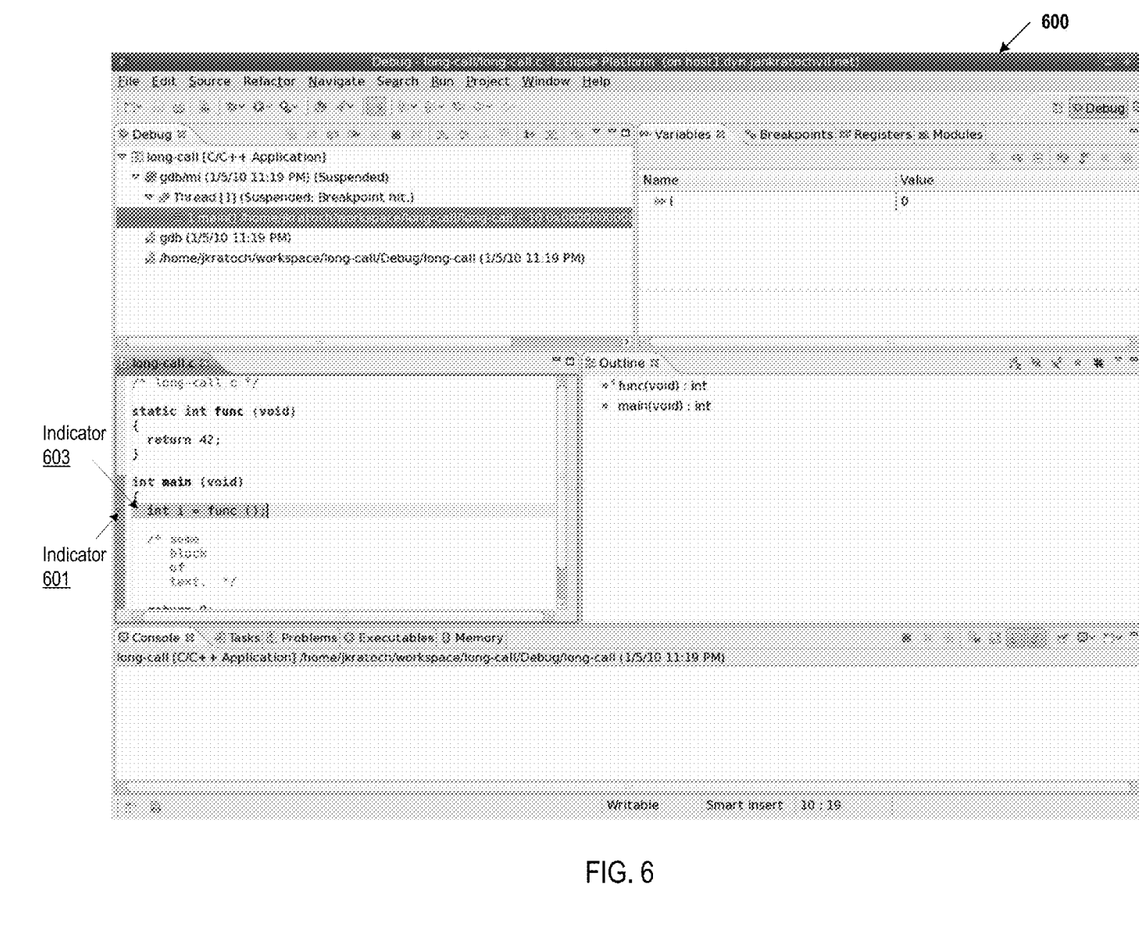
FIG. 6 illustrates an exemplary GUI and components of the GUI to indicate a correct line of source code.

At block 415, a debugging GUI displays an indicator at a line of source code that is correct based on the address value for the virtual debugging instruction pointer (PC) and the method ends. The indicator can represent the location of the virtual debugging instruction pointer (PC) in the source code (the current point of execution). For example, after executing a finish command, the indicator can represent the location of the source line calling the specified function at the caller function. FIG. 6 illustrates an exemplary debugging GUI and components of the GUI to display an indicator for simulating a line of source code, which is described in greater detail below. The debugging GUI displays an indicator at the line of source code that corresponds to the PC address. For example, in normal mode, PC has an address equal to the address of IP (i.e., PC=IP), and the debugging GUI displays an indicator at the line of source code that corresponds to the address of IP. In simulator mode, PC has an address equal to the address of IP minus one (i.e., PC=IP–1), and the debugging GUI displays an indicator at the line of source code that corresponds to the address of IP–1.

Figure 5A:
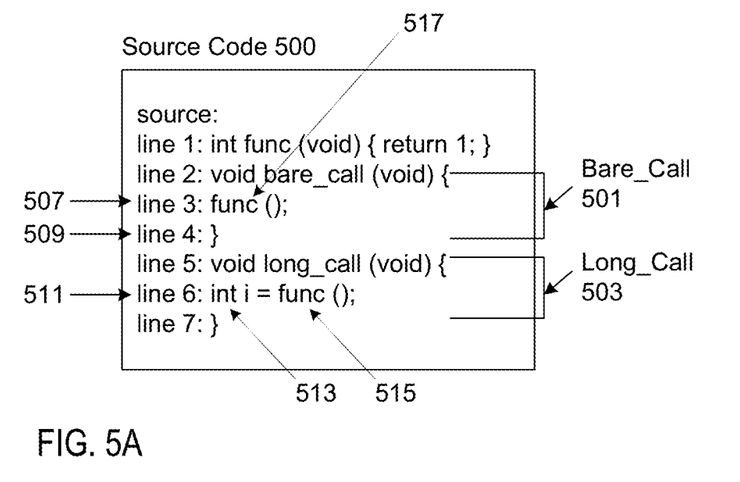
FIG. 5A illustrates exemplary source code.

FIG. 5A illustrates an exemplary source code 500 and components of the source code 500. Source code 500 can include two functions, a function labeled bare_call 501 at line 2 to line 4, and a function labeled long_call 503 at line 5 to line 7. The bare_call function 501 has two instructions, the first one 517 at source line 3 (507) and the second one at line 4 (509). Unlike the bare_call function 501, the long_call function 503 has a local variable i. The long_call function 503 has three instructions, two are 515,513 at source line 6 and the third one is at source line 7. There is an instruction 515 to execute the function and another instruction 513 to assign the return value from executing the function to the local variable i. When the simulator system executes the finish command for the long_call function 503, the finish command stops at line 6 (511) in the source code 500. That is, the simulator system finishes at line 6 (511) after executing the instruction 515 to perform the func function and after executing the last instruction 513 to store the resulting value of the function func into the local variable i at line 6 (511). The simulator system stores the resulting value to the local variable i and the long_call function finishes.

Figure 5B:
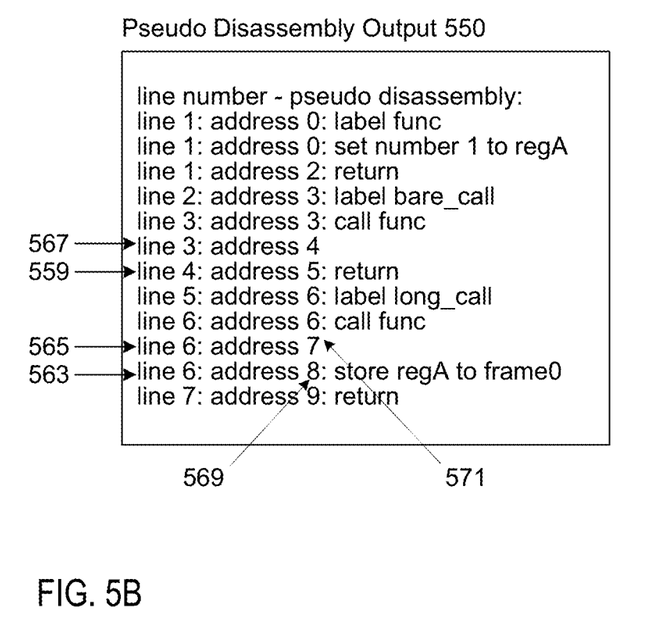
FIG. 5B illustrates exemplary disassembly output.

When the simulator system executes the finish command for the long_call function 503, the simulator system can query the address registers for the instruction pointer (IP) and set the virtual return address (LR) equal to the IP value. For example, the instruction pointer (IP) may be address 8 and the simulator system can set the virtual return address (LR) to the IP value (i.e., LR=8). The simulator system can examine disassembly output to determine which line of source code corresponds to the virtual return address (i.e., LR=8). FIG. 5B illustrates an exemplary disassembly output (also known as a disassembly dump) and components of the disassembly output that can be produced by a debugging tool. The disassembly output corresponds to lines of source code (e.g., source code 500) and addresses. The disassembly output can map each instruction address to a single line of source code. For illustration purposes, FIG. 5B shows exemplary pseudo disassembly output 550. Pseudo disassembly output 550 shows that the line of source code that corresponds to the virtual return address 8 (569) is source line 6 (563).

The simulator system can determine the virtual return address minus one (LR–1) (the address prior to the virtual return address). For example, finishing the func function called from the long_call function 503 results in a virtual return address of 8 (i.e., LR=8). Therefore the address prior to the virtual return address is address 7. The simulator system can examine disassembly output (e.g., pseudo disassembly output 550) to determine which line of source code corresponds to the address at the virtual return address minus one. For example, for address 7 (571), the corresponding line of source code is line 6, as seen at reference 565 in pseudo disassembly output 550.

The simulator system can determine whether the line of source code that corresponds to the virtual return address (LR) is correct by determining whether it is the same line of source code that corresponds to the virtual return address minus one (LR–1). If the source code lines are the same, the simulator system can enable normal mode by setting PC=IP. For example, the source code line that corresponds to the virtual return address 8 (e.g., line 6 at reference 563) is the same line of source code that corresponds to the virtual return address minus one (address 7) (e.g., line 6 at reference 565), and the line of source code that corresponds to the virtual return address (LR) is correct. In this example, the simulator system enables normal mode by setting PC=IP=address 8.

When a user initiates a finish command, the user may expect to see an indicator at the line of source code that corresponds to the source line of a call of the executed function at the caller function. A debugging GUI can display an indicator at a correct line of source code based on the address value for the virtual debugging instruction pointer (PC). The debugging GUI can display an indicator at the line of source code that corresponds to the PC address. In the example for executing a finish command for the func function called from the long_call function 503, the simulator system has enabled normal mode by setting PC=IP=address 8. Source line 6 of the source code corresponds to address 8. The debugging GUI can display an indicator at line 6 of source code. FIG. 6 illustrates an exemplary debugging GUI 600 and components of the GUI 600. GUI 600 displays an indicator 601,603 at the source line of a call of function 'func,' at the caller as a user may expect (the correct line of source code). GUI 600 includes a highlighting indicator 603 and a pointer indicator 601 to show that the virtual debugging instruction pointer (PC) is at the call of the function 'func,' which is at the caller function. An indicator can be an arrow or some other visual indicator (e.g., highlighted text, image, etc.) to indicate the current point of execution in the source code (e.g., at the caller function).

If the line of source code that corresponds to the virtual return address (LR) is not the same line of source code that corresponds to the virtual return address minus one (LR–1), the simulator system enables simulator mode by setting PC=IP–1. For example, in source code 500 in FIG. 5A, for the bare_call function (501), when the simulator system executes the finish command for the function func called from the bare_call function, the simulator system stops at line 4 (509). The simulator system can query the address registers for the next instruction pointer (IP) and may determine that it is address 5 and set the virtual return address (LR) to the IP value (i.e., LR=5). The simulator system can determine from pseudo diassembly output 550 that the line of source code that corresponds to the virtual return address 5 is line 4 (559). The simulator system can determine from pseudo disassembly output 550 that the line of source code that corresponds to the virtual return address minus one (e.g., address 4) is source line 3, as shown at reference 567. The simulator system can determine that the line of source code that corresponds to the virtual return address (e.g., source line 4) is not the same line of source code that corresponds to the virtual return address minus one (e.g., source line 3), and that the line of source code that corresponds to the virtual return address is not correct. The simulator system can then enable simulator mode.

Figure 3B:
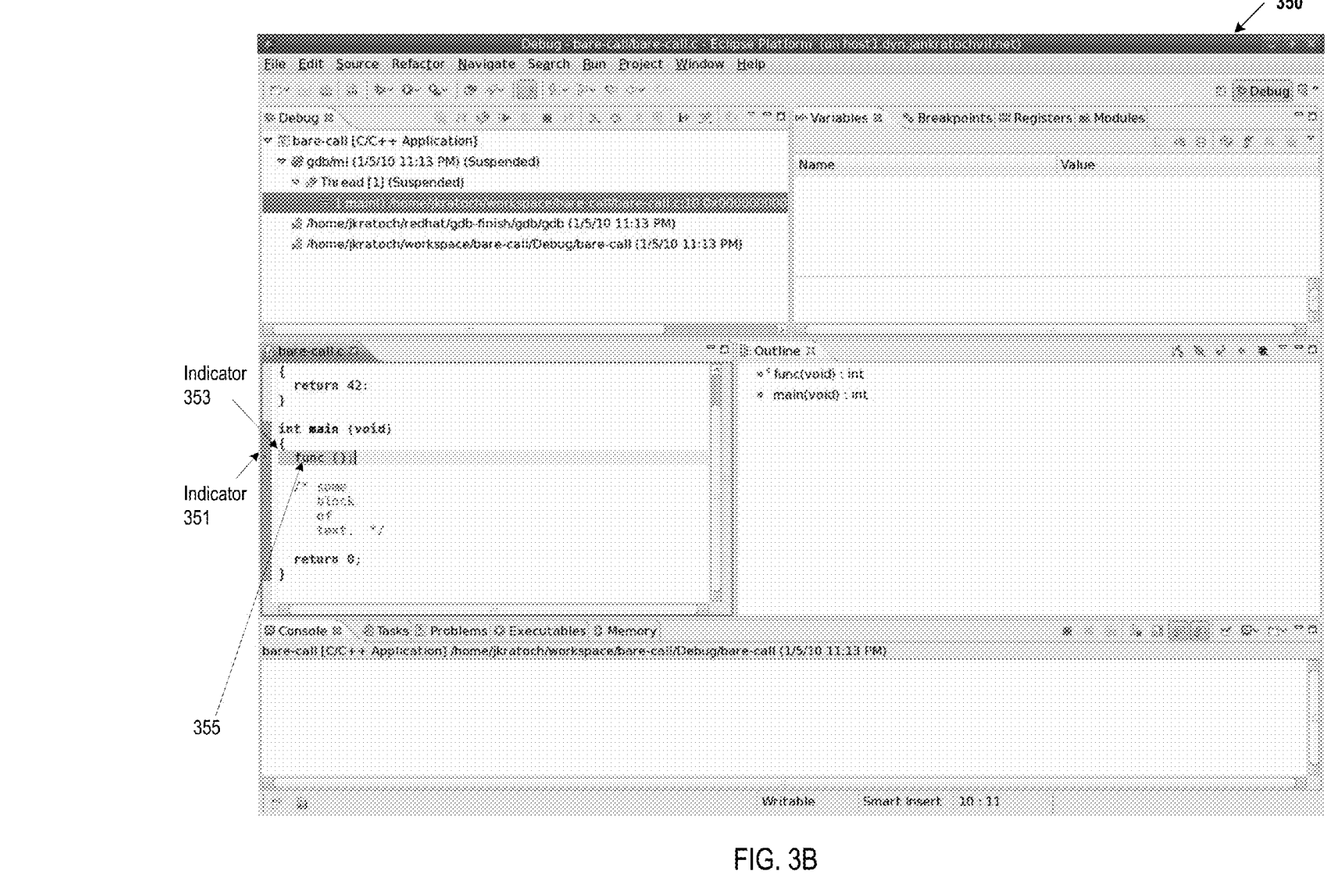
FIG. 3B illustrates an exemplary GUIs and components of the GUI to indicate a correct line of source code.

The simulator system can enable simulator mode by setting PC=IP–1. In this example of executing a finish command for the function func called from the bare_call function 501, the simulator system can set PC=IP–1=address 5–1=address 4 to enable simulator mode. Address 4 corresponds to the source line 3 of the source code. The debugging GUI can display an indicator at line 3 of source code. By displaying an indicator at the line of source code that corresponds to the virtual return address minus one, the simulator system can simulate the correct line of source code (e.g., that the program is returned to the source line containing the call of the executed function at the caller function after executing a finish command). In the bare_call function example, PC=IP−1 corresponds to source line 3 (507), which is the source line containing the call of the executed function at the caller function, and the indicator can be display at line 3 (507), instead of at line 4 (509) which would be displayed from PC=IP. FIG. 3B illustrates an exemplary debugging GUI 350 and components of the GUI 350. GUI 350 displays an indicator 351,353 at the source line of a call of function 'func,' at the caller as a user may expect (the correct line of source code). GUI 350 includes a highlighting indicator 353 and a pointer indicator 351 to show that the virtual debugging instruction pointer (PC) is at the call of the function 'func,' which is at the caller function. An indicator can be an arrow or some other visual indicator (e.g., highlighted text, image, etc.) to indicate the current point of execution in the source code (e.g., at the caller function).

Figure 7:
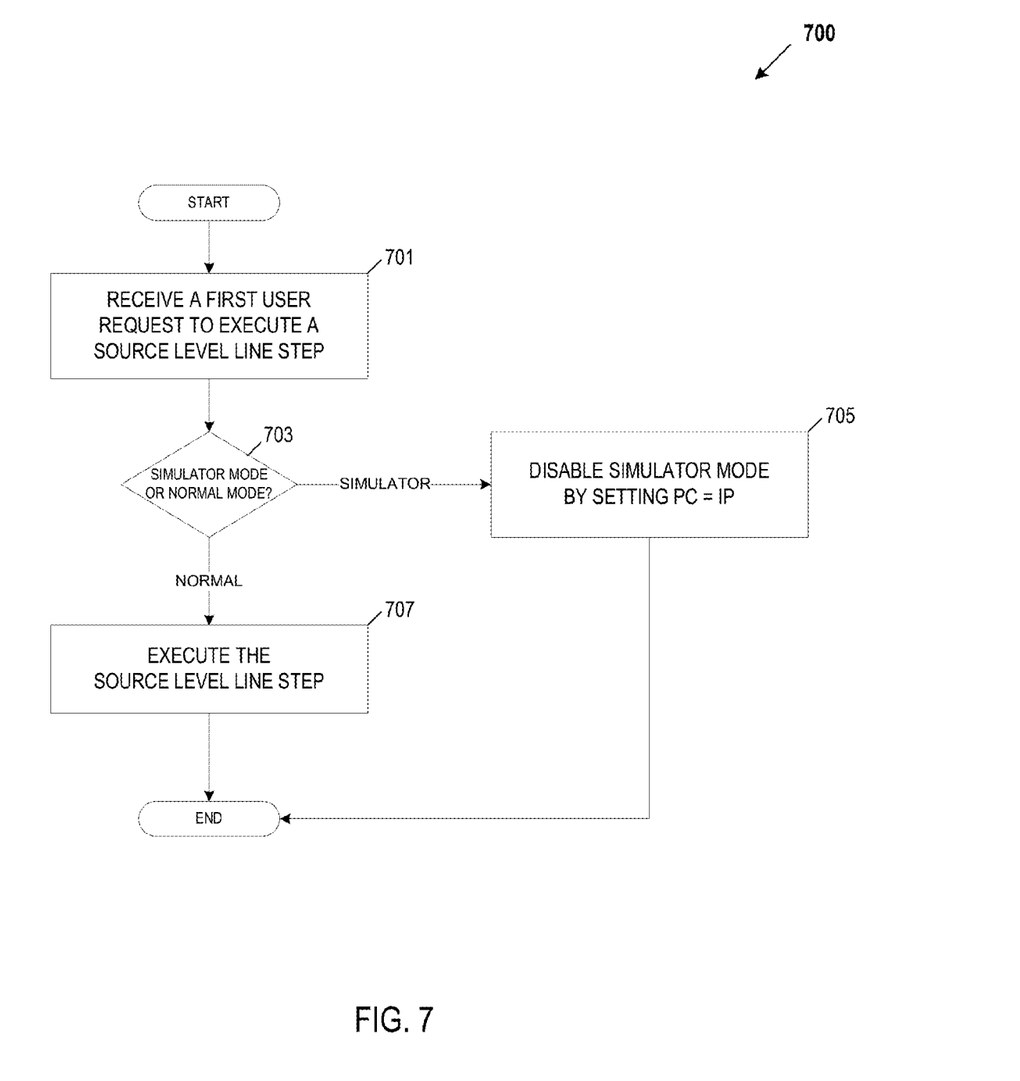
FIG. 7 is a flow diagram which illustrates an embodiment of a method for managing source level line step requests.

FIG. 7 is a flow diagram which illustrates an embodiment of a method 700 for managing source level line step requests. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the source line simulator system 103 in a programming and debugging system 100 of FIG. 1.

In one embodiment, the method 700 can be initiated upon the source line simulator system executing a debugging command (e.g., finish command, return command), querying address registers for an instruction pointer (IP) address after executing the debugging command (e.g., finishing a function), setting the virtual return address (LR) equal to the IP address, determining which line of source code corresponds to the virtual return address (LR), and determining which line of source code corresponds to the address at the virtual return address minus one (LR−1). The simulator system determines whether the line of source code that corresponds to the virtual return address (LR) is correct by determining whether the source code lines are the same. If the source code lines are the same, the simulator system enables normal mode by setting the virtual debugging instruction pointer (PC) equal to IP. If the line of source code that corresponds to the virtual return address is not the same line of source code that corresponds to the virtual return address minus one, the simulator system enables simulator mode to simulate a correct line of source code (e.g., a line of source code corresponding to a source line of a call of the executed function at the caller function after executing a finish command). The simulator system enables simulator mode by setting PC=IP−1. A debugging GUI displays an indicator based on the address value for the virtual debugging instruction pointer (PC).

At block 701, the simulator system may receive a user request to execute a source level line step. Source code can be stepped over, i.e., execute one line of source code at a time. A user can use a debugging tool to 'line step' through the functions to debug inside the functions and to manually inspect the functions. At block 703, the simulator system determines whether simulator mode is enabled or whether normal mode is enabled. The simulator system can examine the value of the virtual debugging instruction pointer (PC) to identify whether PC=IP for normal mode or whether PC=IP−1 for simulator mode. If normal mode is enabled, the simulator system continues to block 707 to execute the source level line step and the method ends. If simulator mode is enabled (block 703), the simulator system does not cause a processor to execute the source level line step, and continues to block 705 to disable simulator mode, and the method ends while displaying to the user the different source line corresponding to the advanced virtual debugging instruction pointer (PC). The simulator system can disable the simulator mode (enable normal mode) by setting the address for the current instruction point equal to the address of the next instruction pointer (PC=IP).

Figure 8:
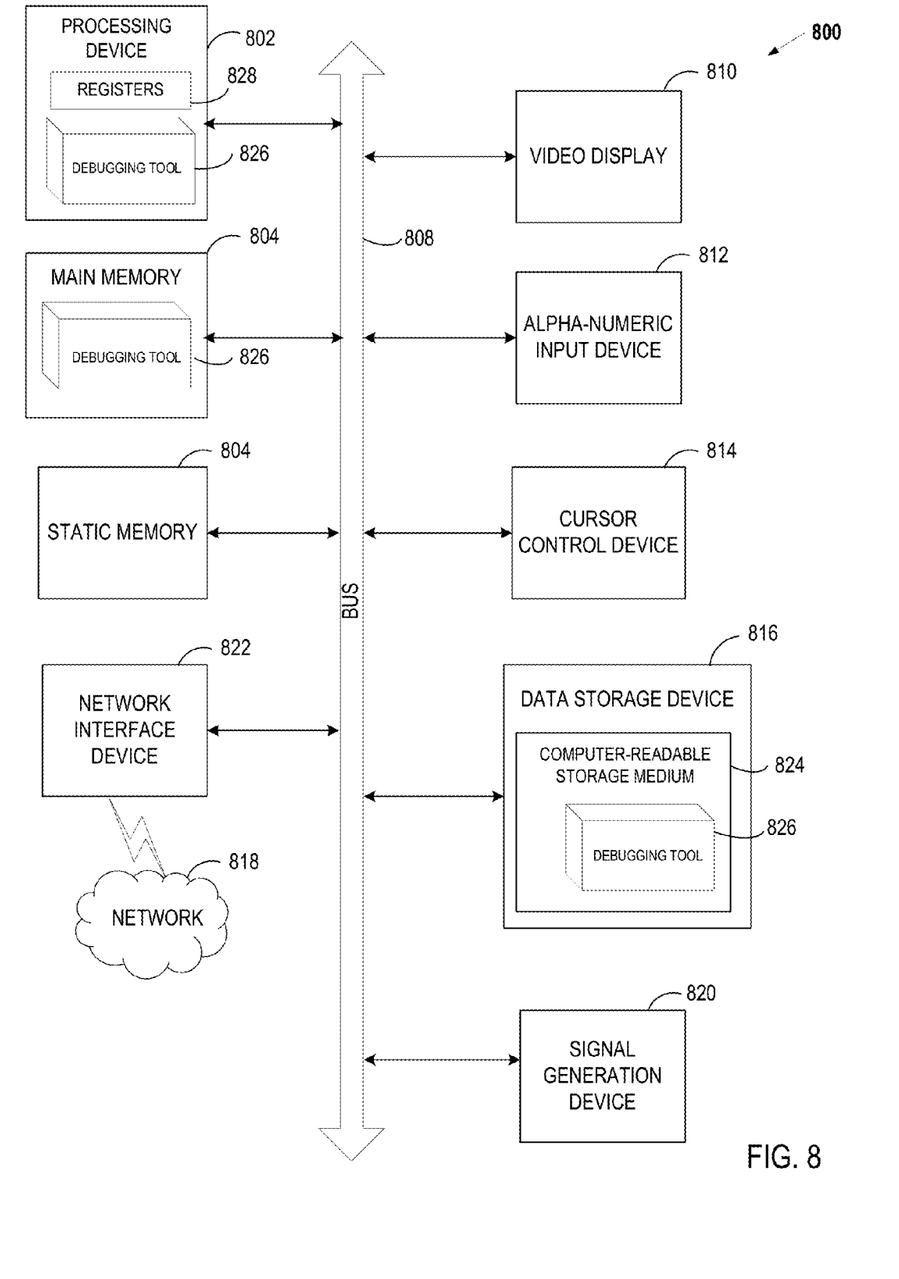
FIG. 8 is a diagram of one embodiment of a computer system for simulating a correct line of source code.

FIG. 8 is a diagram of one embodiment of a computer system for simulating a correct line of source code. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, registers 828, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 can contain several kinds of registers, such as address registers 828. Address registers 828 can hold addresses that may be instructions that indirectly access memory. Processing device 802 is configured to execute the debugging tool 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the debugging tool 826) embodying any one or more of the methodologies or functions described herein. The debugging tool 826 may also reside, completely or at least partially, within the main memory 804 and/or within the processing device 802 during execution thereof by the computer system 800, the main memory 804 and the processing device 802 also constituting machine-readable storage media. The debugging tool 826 may further be transmitted or received over a network 818 via the network interface device 822.

The computer-readable storage medium 824 may also be used to store the debugging tool 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The debugging tool 826, components and other features described herein (for example in relation to FIG. 1) can be implemented as discrete hardware components or integrated in the functionality of hardware components such as ASICS, FPGAs, DSPs or similar devices. In addition, the debugging tool 826 can be implemented as firmware or functional circuitry within hardware devices. Further, the debugging tool 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "enabling," "generating," "querying," "examining," "setting," "receiving," "disabling," "executing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for simulating a correct line of source code. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   determining a virtual return address for a debugging tool in response to the debugging tool executing a debugging finish command to continue execution on a source code;
   determining, by a processing device, that a line of the source code correctly corresponds to the virtual return address when the line of the source code calls a function executed by the debugging tool;
   querying, an address register for an instruction pointer value associated with an instruction address;
   setting the virtual return address to the instruction pointer value;
   determining, by the processing device, that the line of the source code that corresponds to the virtual return address is not correct in view of assembly language of the source code;
   modifying an address value of a virtual debugging instruction pointer to represent a different line of source code that is correct in response to the determination that the line of source code that corresponds to the virtual return address is not correct; and generating a debugging graphical user interface (GUI) that displays an indicator at the different line of source code that is correct using the address value of the virtual debugging instruction pointer.

2. The method of claim 1, wherein the different line of the source code that is correct is a line of the source code that corresponds to a source line of a call of an executed function at a caller function.

3. The method of claim 1, wherein determining that the line of source code that corresponds to the virtual return address is not correct comprises:

determining a line of the source code that corresponds to the virtual return address minus one; and determining that the line of the source code that corresponds to the virtual return address does not match the line of the source code that corresponds to the virtual return address minus one.

4. The method of claim 1, further comprising:

generating a disassembly output by a debugging tool for the source code, wherein the disassembly output maps an instruction address to a line of the source code.

5. The method of claim 4, further comprising:

examining the disassembly output to determine the line of the source code that corresponds to the virtual return address.

6. The method of claim 1, wherein modifying the address value of the virtual debugging instruction pointer comprises:

setting the address value of the virtual debugging instruction pointer equal to an address value of a next instruction pointer minus one.

7. The method of claim 1, further comprising:

receiving a first user request to execute a source level line step; and setting the address value of the virtual debugging instruction pointer equal to an address value of a next instruction pointer.

8. A system comprising:

a persistent storage unit to store source code; and a processing device coupled to the persistent storage unit to:

execute a debugging finish command to continue execution on the source code, determine a virtual return address for a debugging tool in response to executing the debugging finish command, determine that a line of the source code correctly corresponds to the virtual return address when the line of the source code calls a function executed by the debugging tool, query an address register for an instruction pointer value associated with an instruction address, set the virtual return address to the instruction pointer value, determine that the line of the source code that corresponds to the virtual return address is not correct in view of assembly language of the source code, modify an address value of a virtual debugging instruction pointer to represent a different line of source code that is correct in response to the determination that the line of source code that corresponds to the virtual return address is not correct, and generate a debugging graphical user interface that displays an indicator at the different line of source code that is correct using the address value of the virtual debugging instruction pointer.

9. The system of claim 8, wherein the different line of the source code that is correct is a line of the source code that corresponds to a source line of a call of an executed function at a caller function.

10. The system of claim 8, wherein determining that the line of the source code that corresponds to the virtual return address is not correct comprises:

determining a line of the source that corresponds to the virtual return address minus one; and determining that the line of the source code that corresponds to the virtual return address does not match the line of the source code that corresponds to the virtual return address minus one.

11. The system of claim 8, wherein the processing device is further to:

generate a disassembly output for the source code, wherein the disassembly output maps an instruction address to a line of the source code.

12. The system of claim 11, wherein the processing device is further to examine the disassembly output to determine the line of the source code that corresponds to the virtual return address.

13. The system of claim 8, wherein modifying the address value of the virtual debugging instruction pointer comprises:

setting the address value of the virtual debugging instruction pointer equal to an address value of a next instruction pointer minus one.

14. The system of claim 8, wherein the processing device is further to:

receive a first user request to execute a source level line step; and set the address value of the virtual debugging instruction pointer equal to an address value of a next instruction pointer.

15. A non-transitory computer-readable storage medium including instructions that, when executed by a processing device, cause the processing device to execute operations comprising:

determining a virtual return address for a debugging tool in response to the debugging tool executing a debugging finish command to continue execution on a source code;

determining, by the processing device, that a line of the source code correctly corresponds to the virtual return address when the line of the source code calls a function executed by the debugging tool;

querying, an address register for an instruction pointer value associated with an instruction address;

setting the virtual return address to the instruction pointer value;

determining, by the processing device, that the line of the source code that corresponds to the virtual return address is not correct in view of assembly language of the source code;

modifying an address value of a virtual debugging instruction pointer to represent a different line of source code that is correct in response to the determination that the line of source code that corresponds to the virtual return address is not correct; and generating a debugging graphical user interface (GUI) that displays an indicator at the different line of source code that is correct using the address value of the virtual debugging instruction pointer.

16. The non-transitory computer-readable storage medium of claim 15, wherein the different line of the source code that is correct is a line of the source code that corresponds to a source line of a call of an executed function at a caller function.

17. The non-transitory computer-readable storage medium of claim 15, wherein determining that the line of the source code that corresponds to the virtual return address is not correct comprises:
    determining a line of source code that corresponds to the virtual return address minus one; and
    determining that the line of source code that corresponds to the virtual return address does not match the line of source code that corresponds to the virtual return address minus one.

\* \* \* \* \*